United States Patent Office 3,641,212
Patented Feb. 8, 1972

3,641,212
HIGH IMPACT STRENGTH STYRENE-MALEIC ANHYDRIDE COMPOSITIONS
Munisamappa Narayana and Henno Keskkula, Midland, and Jerry E. Mason, Hemlock, Mich., assignors to The Dow Chemical Company, Midland, Mich.
No Drawing. Filed Mar. 28, 1969, Ser. No. 811,671
Int. Cl. C08d 9/08; C08f 29/56
U.S. Cl. 260—893                                              6 Claims

ABSTRACT OF THE DISCLOSURE

High impact compositions having high heat deformation characteristics are prepared by intimately admixing certain styrene-maleic anhydride and like thermoplastic copolymers with nitrile rubber containing from about 18 to 42 weight percent of a nitrile monomer.

BACKGROUND OF THE INVENTION

High impact polystyrene thermoplastic compositions containing rubber are well known and widely used commercially. However, the poor heat distortion and solvent resistance of polystyrene limit its usefulness in many application areas where these properties are important to the end use.

To improve these properties attempts have been made to alter the polystyrene by copolymerizing with styrene certain monomers such as methacrylic acid, acrylonitrile, maleic anhydride, etc. Unfortunately, improvements in heat distortion and/or solvent resistance are obtained at the expense of impact properties since the addition or rubber modifiers appears to give uncertain and unpredictable impact properties. Frequently, the rubber modifiers are not compatible with the modified styrene copolymers.

U.S. 2,914,505 proposed to blend a nitrile rubber with a terpolymer of, for example, 50 parts styrene, 35 parts acrylonitrile and 15 parts of maleic anhydride to obtain "tough" plastic compositions with higher softening temperatures. However, attempts to prepare such tough plastic compositions have not been successful due to incompatability of the terpolymer and the nitrile rubber.

SUMMARY OF THE INVENTION

Compatible, high impact thermoplastic composition which have a good balance of other physical properties such as tensile strength, solvent resistance, high heat deformation may be prepared from an intimate blend of about 15 to 50 percent by weight of a nitrile rubber and from about 85 to 50 percent by weight of an interpolymer prepared to contain from about 5 to 30 percent by weight of an unsaturated dicarboxylic acid anhydride. Nitrile rubbers useful in this invention contain from about 18 to 42 precent by weight of a nitrile monomer such as acrylonitrile.

DETAILED DESCRIPTION OF THE INVENTION

Nitrile rubbers containing from about 18 to 42 percent by weight of a nitrile monomer such as acrylonitrile have been found to impart improved impact strength to styrene-maleic anhydride and like copolymers without detracting from other desirable properties such as heat distortion, tensile strength, etc. In particular this invention provides for a combination of improved impact strength and high heat distortion properties.

Nitrile rubber is a generic, well known term used to generally describe copolymers of an unsaturated nitrile monomer and a diene such as butadiene. Principally the term describes copolymers of acrylonitrile and butadiene both as gum rubbers or latexes. Other nitriles such as methacrylonitrile and the like may replace or be used in admixture with acrylonitrile. Likewise the butadiene may be replaced by other diene monomers such as chloroprene, isoprene, and the like or by mixtures of dienes. Also, it is known to use small amounts of other monomers in the preparation of nitrile rubbers, monomers such as styrene, methyl methacrylate, vinylidene chloride, ethyl acrylate and the like. While nitrile rubbers may be prepared to contain as much as 50% by weight of a nitrile monomer, the nitrile rubbers of this invention are limited to those which contain from about 18 to 42 percent nitrile monomer.

Nitrile rubbers are conventionally prepared as an emulsion in which the copolymerizable monomers are first emulsified in an aqueous medium by means of an emulsifying agent which can be one or more of a soap (such as an alkali metal salt of a saturated or unsaturated carboxylic acid such as an alkli metal stearate, oleate, etc.) or a rosin acid soap (such as an alkali metal abietate), or other suitable surface active agents (such as the sodium or potassium salts of the condensation product of beta-naphthalene sulfonic acid and formaldehyde, alkali metal salts of alkyl aryl sulfonates, ethylene oxide condensates with alkyl phenols etc.). The polymerization is made to take place by the addition of a suitable catalyst at suitably controlled temperatures. Peroxygen catalysts such as persulfates and hydroperoxides are usually employed and the polymerization temperature may vary up to about 120° C.

The high impact thermoplastic compositions of this invention are prepared by intimately mixing or blending about 15 to 50 percent by weight of said nitrile rubber with about 85 to 50 percent by weight of thermoplastic resin which comprises from about 5 to 30 weight percent of an unsaturated dicarboxylic acid anhydride and from about 95 to 70 weight percent of a monovinyl aromatic monomer. Suitable anhydrides include maleic anhydride, itaconic anhydride, citraconic anhydride, aconitic anhydride and the like. Aromatic monomers include styrene, vinyl toluene chlorostyrene, $\alpha$-methyl styrene, t-butyl styrene, dichlorostyrene and the like. Mixtures of said monomers may also be used. Preferably the thermoplastic is a copolymer of styrene-maleic anhydride.

Various methods are known whereby said thermoplastic copolymer may be prepared. Non-equimolar copolymers such as described above, are readily prepared by a continuous process such as described in U.S. 2,769,804. Preferably, the thermoplastic is a homogeneous, essentially gel free copolymer prepared according to U.S. 3,336,-267 wherein the copolymer is essentially optically transparent, having optical transmissions above about 80%, and wherein at least about 90 percent of the copolymer has an anhydride composition within a range of about 5 percent as determined by fractionation analysis. Further evidence of homogenity and absence of gels in the copolymer is found in the fact that no filtering of solutions of the copolymer is necessary before making viscosity determinations and that melt index determinations give rise to uniform, gel-free strands. The copolymer should also have a viscosity of at least about 2 cps. (measured as a 10% by weight solution in methyl ethyl ketone at 25° C.) and preferably a viscosity of about 4 to 12 cps.

Mixing of the nitrile rubber and the thermoplastic copolymer may be accomplished in different ways, but usually includes a step where the components are mechanically worked at a temperature high enough to plasticize the mass, such as by milling on a roll mill, or an internal mixer of the Banbury type or by compounding in a Meili mixer. The temperature will vary depending on the thermoplastic copolymer composition, but temperatures in the range of 160° C. to about 200° C. and higher have been found adequate.

To obtain a good balance of physical properties the high impact composition may contain from about 10 to 50 weight percent of the nitrile rubber. Preferably the composition contains from about 20 to 40 percent of said rubber. Much higher proportions of rubber, however, may be combined with the thermoplastic copolymer wherein in effect the thermoplastic becomes a reinforcing material for the rubber. In certain applications where high heat distortion is not needed such compositions may be especially useful for their high impact strength and more "rubbery" characteristics.

The following non-limiting examples will further illustrate this invention. All percentages are by weight unless otherwise specified.

EXAMPLE 1

A styrene-maleic anhydride copolymer (SMA) containing about 18 percent maleic anhydride and having a viscosity of about 11 cps. was compounded in varying proportions with a nitrile rubber and with two other types of rubber for comparison purposes.

The nitrile rubber was a commercially available medium high nitrile rubber (Chemigum N8, Goodyear Tire and Rubber Co.) containing about 31.5 percent of acrylonitrile, stabilized with a non-staining antioxidant and having a Mooney viscosity of 81–95. For comparison purposes a 40/60 styrene-butadiene block rubber copolymer and a commercially available polybutadiene rubber (Diene C.F. 35, Firestone Tire and Rubber Co.) were used.

The proportions, method of mixing and physical properties of compression molded articles are shown in Table I. For compression molding about 65–95 gms. of material was molded at about 215° C. to 250° C. with about 6–10 minutes of melting time, 2–4 minutes at maximum pressure and about 15 minutes of cooling time.

The improvement with the nitrile rubber (N8) is evident by comparing the impact strengths shown in the last column. The last result with the 40/60 block rubber shows improved impact but both the tensile strength and Vicat temperature were adversely affected.

EXAMPLE 2

With the nitrile rubber of Example 1 a series of tests were made in which the percent of maleic anhydride (MA) was varied from 5 to 33 percent and the results are tabulated in Table II.

While improvements are found at the extremes of 5% and 33% maleic anhydride, the properties fall off too rapidly outside this range to be useful. However, at 33% maleic anhydride the Vicat temperature becomes so high that compounding is very difficult due to the poor flow of the thermoplastic polymer. A good balance of impact and Vicat temperature is obtained between the extreme percentages, with a preferred range of about 15 to 25 percent giving the best properties.

TABLE II

| Proportions | | | Properties | | | |
|---|---|---|---|---|---|---|
| SMA | Rubber | Percent MA | Tensile, p.s.i. | Elong., percent | Vicat, ° C. | Izod impact, ft./lb./in notch |
| 176.9 | 48.1 | 5 | 3,090 | 1.5 | 116 | 0.5 |
| 144.8 | 80.2 | 5 | 2,020 | 2.2 | 112 | 1.0 |
| 168.9 | 56.1 | 18 | 3,580 | 1.4 | 137 | 1.9 |
| 144.8 | 80.2 | 18 | 2,970 | 4.0 | 133.5 | 5.7 |
| 144.8 | 80.2 | 25 | 3,380 | 3.0 | 150 | 5.7 |
| 176.9 | 48.1 | 33 | 2,270 | 0.6 | 170 | 0.6 |
| 176.9 | [1]48.1 | 18 | 4,370 | 1.4 | 135 | 0.6 |

[1] For comparison a high nitrile rubber (Chemigum N3) containing about 42.3 percent acrylonitrile was used.

EXAMPLE 3

Tests were also made with styrene-maleic anhydride copolymers (18% MA) with varying viscosities and the nitrile rubber of Example 1. Compositions were all prepared to contain about 35.6 percent rubber.

| SMA visc., cps. | Izod impact, ft.-lb./in-notch | Vicat, ° C. |
|---|---|---|
| 0.7 | 1.09 | 78 |
| 4.0 | 6.48 | 127 |
| 12.0 | 6.46 | 134 |

Similar results to those of the preceding examples are found when the Chemigum N8 is replaced with a nitrile rubber containing lesser amounts of acrylonitrile.

EXAMPLE 4

A terpolymer was prepared according to the procedure and receipe of Example 3 in U.S. 2,914,505 from 50 parts of styrene, 15 parts of maleic anhydride and 35 parts of acrylonitrile. The above polymer could not be blended at temperatures of 160–200° C. either on a roll mill or in the Meili mixer with a nitrile rubber. The terpolymer, itself, had a Vicat of 106.5° C. and an Izod impact of 0.28 ft.-lb./in.-notch.

The high impact compositions of this invention may be blended with additional materials such as fillers, pigments, reinforcing material, mold release agents, stabilizers, compounding assists, etc. With the combination of improved impact and high heat distortion (Vicat temperature) the compositions are especially useful in injection or compression molding of a variety of articles where these properties are particularly useful such as machine parts, containers, pipes, duct work, electrical parts and a variety of other articles.

What is claimed is:

1. An impact resistant composition comprising from about 15 to 50 weight percent of a nitrile rubber of an unsaturated nitrile monomer and a diene wherein said rubber contains in polymerized form about 18 to 42 weight percent of a nitrile monomer, and from about 85 to 50 weight percent of a thermoplastic copolymer consisting in polymerized form of about 5 to 30 weight per-

TABLE I

| Type of rubber | Proportions, gms. | | Method of compounding [1] | Properties | | | |
|---|---|---|---|---|---|---|---|
| | SMA | Rubber | | Tensile rupture, p.s.i. | Percent elong. | Vicat, ° C. | Izod impact, ft.-lbs./in- notch |
| Chemigum N8 | 176.9 | 48.1 | B | 4,340 | 1.7 | 136 | 1.80 |
| | 160.8 | 64.2 | B | 3,670 | 2.1 | 134 | 3.99 |
| | 176.9 | 48.1 | A | 3,632 | 4.3 | 135 | 1.02 |
| | 160.8 | 64.2 | A | 2,990 | 7.7 | 133 | 2.45 |
| Diene C.F. 35 | 202.5 | 22.5 | B | 3,540 | 0.9 | 140 | 0.2 |
| | 191.25 | 33.75 | B | 2,880 | 1.1 | 140 | 0.25 |
| | 180 | 45 | B | 2,500 | 1.1 | 140 | 0.26 |
| 40/60 SB | 80 | 45 | A | 1,700 | 1.6 | 140 | 0.66 |
| | 80 | 18 | A | 3,050 | 0.8 | 141 | 0.51 |
| | 100 | 100 | B | 920 | 2.8 | 111 | 1.69 |

[1] A = Compounded at about 200° C. on Thropp Mill rolls with about 0.1 percent of Ionol, 2,6-ditertiarybutyl-4-methyl phenol, added; B = compounded at about 200° C. for 7 minutes in a Meili mixer with about 0.1 percent of Ionol added.

cent of an unsaturated dicarboxylic acid anhydride and from about 95 to 70 weight percent of a monovinyl aromatic monomer, wherein said thermoplastic copolymer has a viscosity of at least about 2 cps. (measured as a 10 weight percent solution in methyl ethyl ketone at 25° C.).

2. The composition of claim 1 wherein said rubber comprises from about 20 to 40 weight percent of the composition.

3. The composition of claim 1 wherein said thermoplastic copolymer has a viscosity of about 4 to 12 cps.

4. The composition of claim 1 wherein said thermoplastic copolymer is a copolymer of styrene and maleic anhydride.

5. The composition of claim 1 wherein said thermoplastic copolymer is a homogeneous copolymer.

6. The composition of claim 1 wherein said anhydride comprises from about 15 to 25 weight percent of said thermoplastic copolymer.

References Cited

UNITED STATES PATENTS

| | | | |
|---|---|---|---|
| 2,614,093 | 10/1952 | Wheelock | 260—892 |
| 2,914,505 | 11/1959 | Roper et al. | 260—893 |
| 2,944,044 | 7/1960 | Baer | 260—892 |
| 3,428,596 | 2/1969 | Strand et al. | 260—892 |

JOHN C. BLEUTGE, Primary Examiner

U.S. Cl. X.R.

260—876 B, 890